United States Patent [19]

Tong Loh

[11] Patent Number: 5,363,309
[45] Date of Patent: Nov. 8, 1994

[54] NORMAL DISTANCE CONSTRUCTION FOR MACHINING EDGES OF SOLID MODELS

[75] Inventor: Wickham H. Tong Loh, Los Angeles, Calif.

[73] Assignee: International Business Machines Corp., Armonk, N.Y.

[21] Appl. No.: 24,118

[22] Filed: Feb. 25, 1993

[51] Int. Cl.⁵ .............................................. G06F 15/46
[52] U.S. Cl. ...................... 364/474.34; 364/474.32; 364/474.31; 318/570; 318/573; 408/13
[58] Field of Search ............... 364/474.28, 474.29, 364/474.3, 474.31, 474.32, 474.33, 474.34, 474.35, 167.01; 318/569–574, 578; 409/69, 78, 80; 408/8–13

[56] References Cited

U.S. PATENT DOCUMENTS

| | | | |
|---|---|---|---|
| 4,535,408 | 8/1985 | Kishi et al. | 364/474.29 X |
| 4,546,427 | 9/1985 | Kishi et al. | 364/168 |
| 4,559,601 | 12/1985 | Kishi et al. | 364/474.29 X |
| 4,697,240 | 10/1987 | Cedar et al. | 364/474 |
| 4,703,415 | 10/1987 | Kishi et al. | 364/474.32 X |
| 4,704,687 | 11/1987 | Kishi et al. | 364/474.32 |
| 4,794,742 | 1/1989 | Henderson | 52/80 |
| 5,023,800 | 6/1991 | Carver et al. | 364/474.24 |
| 5,132,913 | 7/1992 | Seki et al. | 364/474.31 |
| 5,185,855 | 2/1993 | Kato et al. | 395/129 |

FOREIGN PATENT DOCUMENTS 92-309754 8/1988 European Pat. Off. .
63-146109 6/1988 Japan .

*Primary Examiner*—Roy N. Envall, Jr.
*Assistant Examiner*—Cameron H. Tousi
*Attorney, Agent, or Firm*—Randy W. Lacasse; David J. Kappos; Joseph F. Villella

[57] ABSTRACT

A computer-based system and method is provided for positioning a cutter tool to an edge of a solid model in a computer aided manufacturing environment. A shortest distance and direction required to position the machine tool cutter to the edge of the solid model is determined. Edges are defined as three dimensional space curves. The machine tool cutter is defined as a convex envelope. Using the space curve definition, the cutter location, and the center axis of rotation for the cutter, computations are executed to determine a directional vector and distance such that moving the cutter along the vector for the prescribed distance will cause it to be in contact with the curve. Adjustments are available which cause the cutter to travel to offsets from the curve, including aligning the front of the cutter to the curve, the end of the cutter on the curve, or the back of the cutter past the curve.

18 Claims, 15 Drawing Sheets

COMPUTING ALIAS OF NORMAL DISTANCE TO SPACE CURVE

CUTTER PROFILE

COMPUTING ALIAS OF NORMAL DISTANCE
TO SPACE CURVE

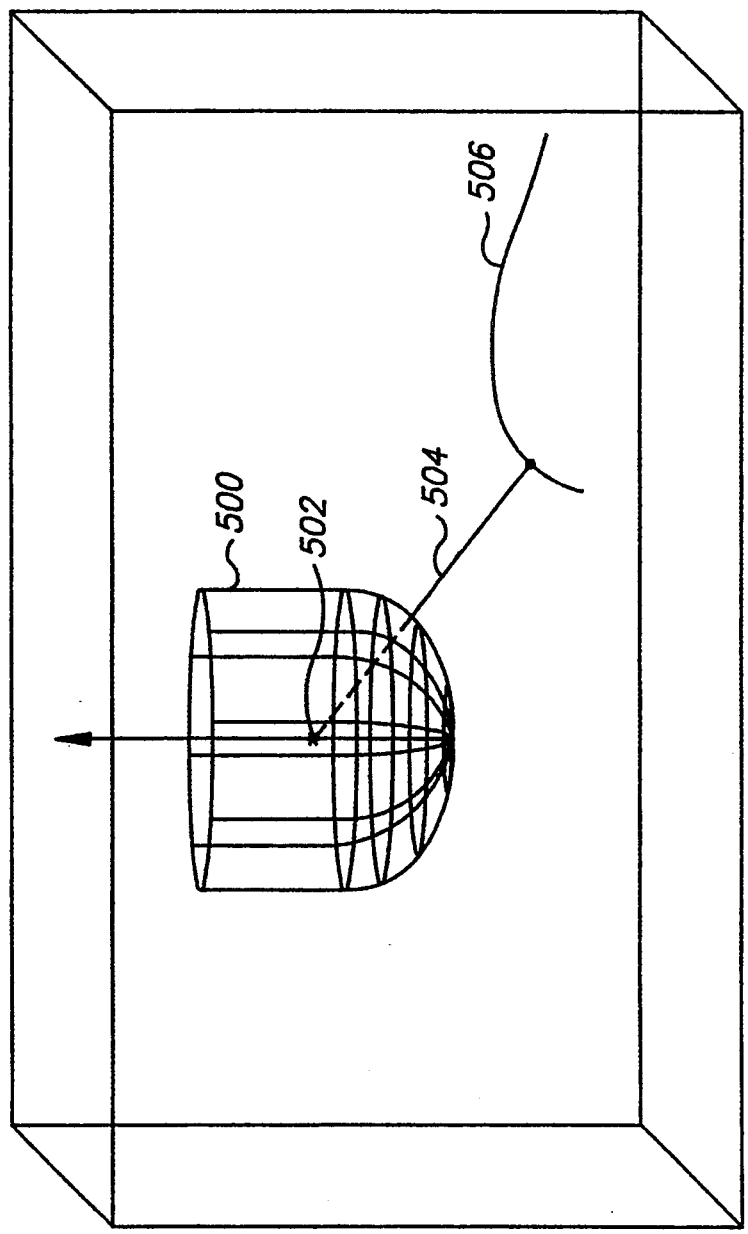
FIG. 5A  GEOMETRY OF ALIAS COMPUTATION

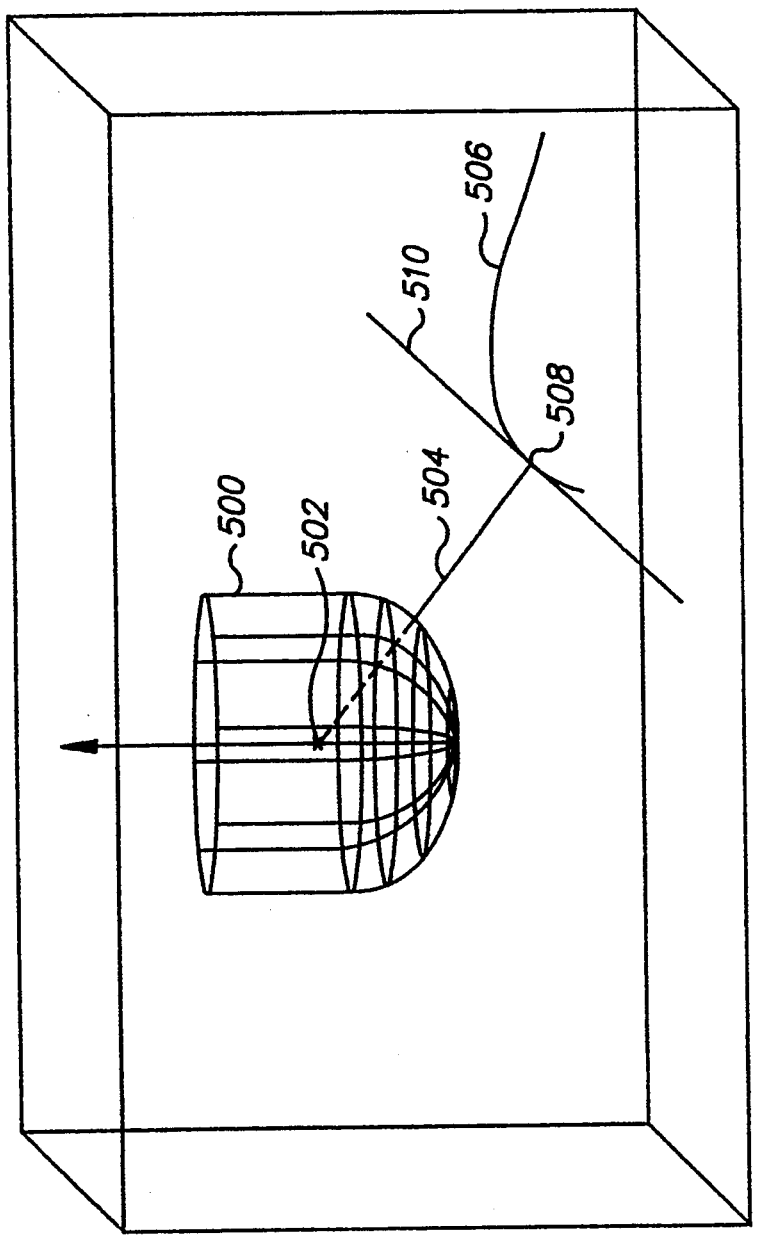
FIG. 5B   GEOMETRY OF ALIAS COMPUTATION

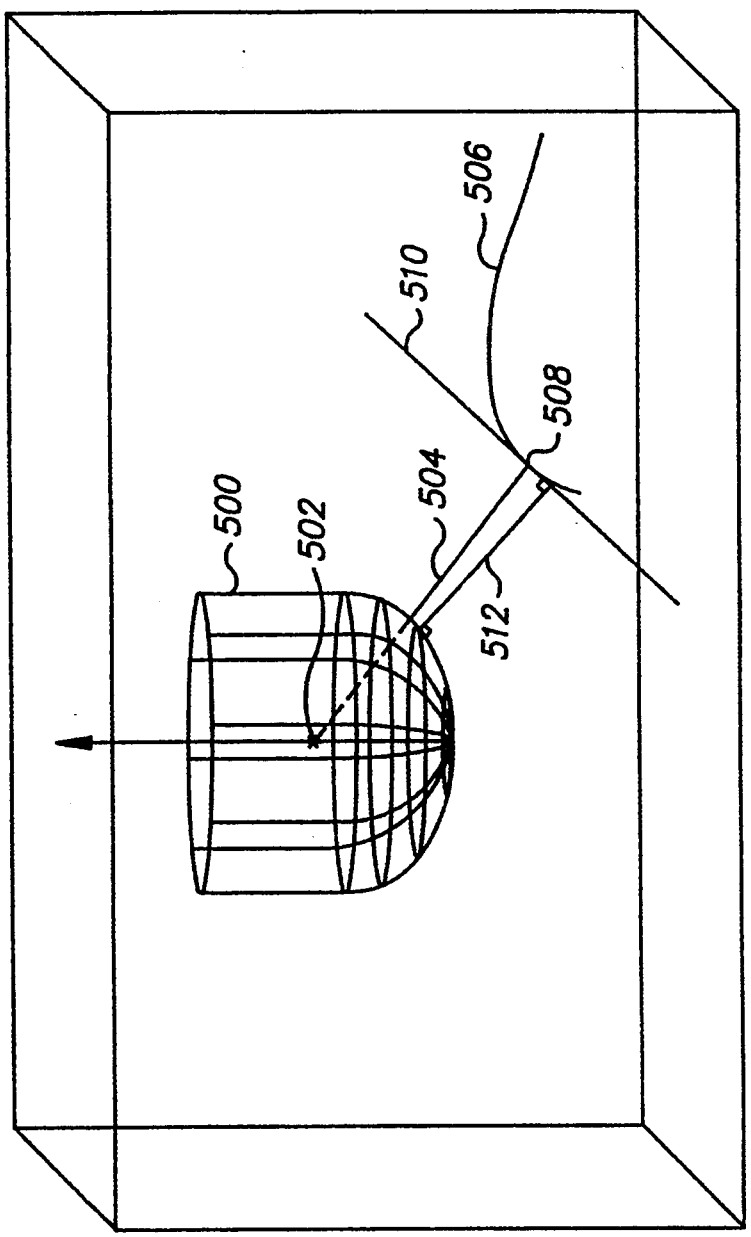
FIG. 5C  GEOMETRY OF ALIAS COMPUTATION

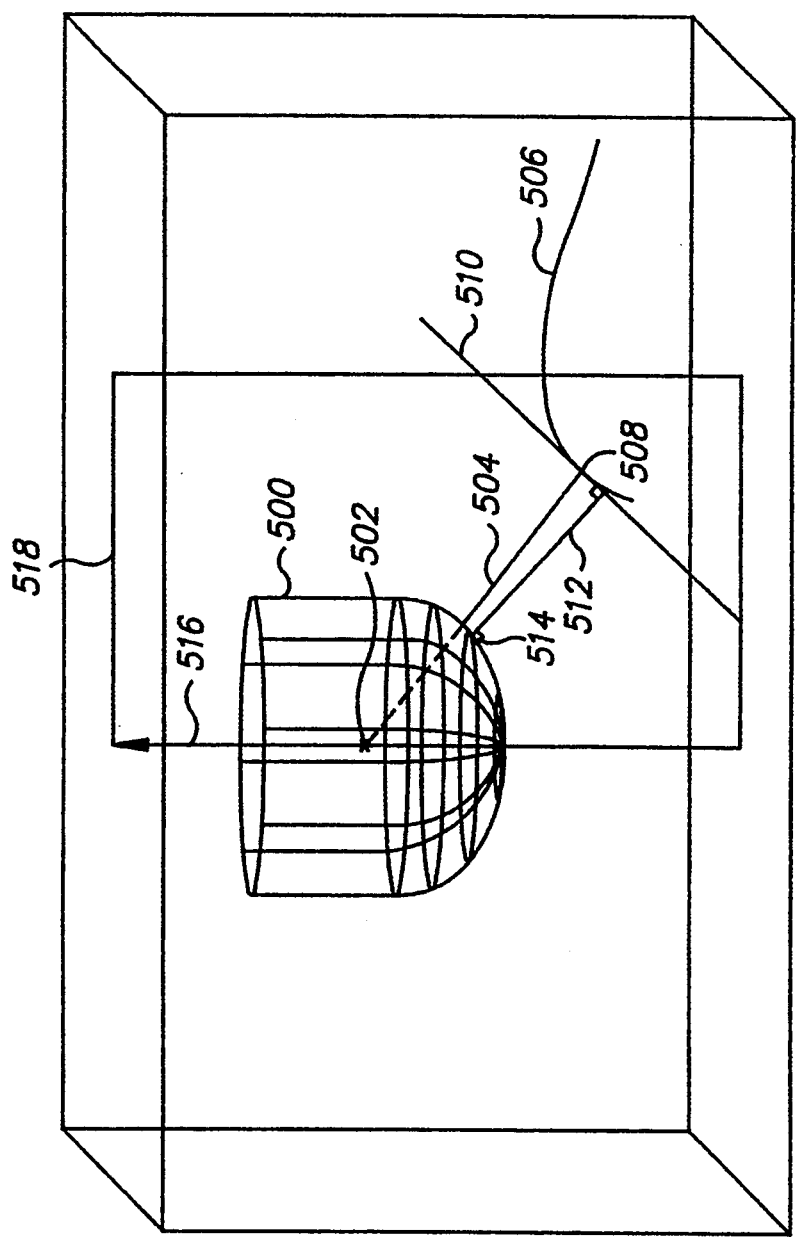
FIG. 5D GEOMETRY OF ALIAS COMPUTATION

GEOMETRY OF ALIAS COMPUTATION

GEOMETRY OF CUTTER NORMAL PROJECTION $$COSL = COS\ (\alpha)$$
$$SINL = COS\ (90°-\alpha)$$

GEOMETRY OF NORMAL DISTANCE TO
A LINE SEGMENT

GEOMETRY OF NORMAL DISTANCE TO
A CIRCLE

NORMAL DISTANCE CONSTRUCTION FOR MACHINING EDGES OF SOLID MODELS

FIELD OF INVENTION

This invention relates in general to computer aided manufacturing and in particular to a system and method for guiding a numerically controlled machine tool to machine the edges of solid models by following a three dimensional space curve.

BACKGROUND OF THE INVENTION

Computer-aided-manufacturing (CAM) involves the precise machining, under the control of numerical data provided by a computer system, of a manufactured part (a solid object) from a raw workpiece. CAM systems are used widely in the manufacturing industry to produce everything from plastic toys to turbo fan blades for jet engines. The numerical control (NC) data used by a CAM system to control the machining process is typically generated based on a geometrical description of the desired part created using a computer-aided-design (CAD) system. The NC data itself guides a machine tool, or cutter, to cut portions away from a workpiece until the part takes shape in accordance with its geometrical CAD description.

An extraordinary degree of precision is required to properly position the cutter relative to the part during the machining process. If the cutter is oriented too far into the part, it may gouge the part, rendering it unusable scrap. If the cutter leaves excess material on the part, the required tolerances may be exceeded, to similar effect. Moreover, since many modern manufactured parts must meet tolerances in the thousandths of millimeters, very little margin of error is available between gouging and undue excess.

Prior art CAM systems have developed various techniques to provide precise positioning of the cutter to the part surface. In general, those techniques that are accurate enough to perform precision manufacturing recognize a distinction between the normal (perpendicular) distance to a surface and the shortest distance to that surface. By using the normal distance, the CAM system can accurately account not only for the contours of the part, but also for the dimensions of the cutter. With this information the cutter can be positioned precisely to an edge or a side of a surface, or a starting point or endpoint of a cut by directing the cutter TO the surface, ON the surface, or PAST the surface.

One prior art cutter positioning technique involves describing the required path of the cutter using one surface and one point on the surface. In this technique, known as surface-driven positioning, a normal is calculated corresponding to the surface at the reference point, and the cutter is positioned by moving it directly from its initial position toward the reference point until it reaches the surface. Then a new reference point is chosen and the process repeated until the surface is fully developed. While this approach is generally adequate to machine a single surface, it becomes inaccurate in cases where the cutter must be positioned to more than one surface simultaneously, as where three surfaces meet to form an inside corner. In such cases, surface-driven positioning tends to gouge the additional surface(s) since by its definition (one surface and one point) it does not carry enough information to track the additional surfaces. It also can gouge even the first surface in some cases, since the cutter shape and additional contours of the first surface unrelated to the current positioning task are not taken into account.

Another technique for positioning a cutter to a part surface involves the use of three surfaces, two to describe the cutter path and a third to describe the desired stopping point. This technique, used by the APT (Automatically Programmed Tool) machine tool programming language, employs the normal distance from the cutter to each surface. At the surface point on each surface where the normal distance is obtained, a surface normal and a tangent plane is constructed. The cutter is positioned in contact with the three tangent planes simultaneously, and the process is repeated until the cutter is in contact with all three surfaces. To compute the normal distance to a surface, a process known as Unit Normal and Directed Distance (UNDD) is executed. FIGS. 1(a)-1(e) illustrate the geometry involved in the UNDD computations. Center 108 is computed for cutter 102 along axis of rotation 104. Cutter center 108 is used to compute the shortest distance to the surface of workpiece 106. This distance is labelled 110. A radius of curvature is computed for surface 106 at shortest distance point 110, and a center of curvature is determined at 112. determined. Then the normal distance from center of curvature 112 to cutter 102 is computed at 114, and the point (116) at which this normal distance intersects cutter 102 is used to compute a normal to the cutter envelope. This new cutter normal at the cutter point is intersected with surface 106 to in turn define another point on the surface at 118. Based on point 118, a new center of curvature is determined at 120, and the process is repeated until it converges to a stable result. Convergence is obtained when the cutter normal and surface normal are antiparallel to one another, which indicates that the center of curvature of the surface and the center of curvature of the cutter are aligned.

Normal distance positioning allows for the representation of several types of surfaces by analytic equations or geometrical characteristics. For instance, a plane is represented by the equation $Ax+By+Cz-D=0$, while a sphere is represented by its center point and its radius. Cylinders, cones, quadratics, tabulated cylinders, and ruled surfaces can also be represented. For all these surfaces, the result of a normal distance computation produces a scalar distance S, a pair of points, [CP SP], and a pair of unit vectors, [CN SN]. S represents the distance between the pair of points, where CN and SN are the cutter normal and the surface normal, respectively, CP is a point on the cutter envelope and SP is a point on the surface such that the distance between them is either the local minimal or maximal distance between the cutter and the surface. The vector at the cutter point perpendicular to the cutter envelope is called the cutter normal. The vector at the surface point perpendicular to the surface at SP is called surface normal or SN. At CP and SP, where the normal distance is obtained, the surface normal and cutter normal are either parallel or anti-parallel. The normal distance elements have the property that if the cutter is moved a distance S in the direction of CN, CP and SP will coincide and the cutter will be in contact with the surface. Thus, the set of elements [CP, SP, CN, SN, S] are said to define the normal distance.

The normal distance positioning approach represents an improvement over the surface driven approach in that it can accurately position the cutter to multiple surfaces without gouging. However, in cases where it is desired to machine a feature which cannot be described by a surface, even the normal distance positioning approach may be inadequate to accurately guide the cutter. One such case involves machining a part according to a space curve, that is an edge. Since a space curve has no area, it is not possible to compute a direct distance from the cutter to a space curve. Further, since a space curve has an infinite number of surface normals rather than a single surface normal, it is not possible to compute a surface normal at a point on a space curve. Thus, what is required is a technique to provide a boundary defined by a space curve, which boundary includes the properties of a surface needed to compute a normal distance. Given the normal distance, it would then be possible to accurately position the cutter to the space curve.

SUMMARY OF THE INVENTION

In accordance with the invention, there is provided a computer-based system and method for guiding a numerically controlled machine tool to machine edges of parts according to three dimensional space curves. A method is provided for determining the shortest distance and direction required to position the machine tool cutter to the edge of a part. The edge is defined as a three dimensional space curve. The cutter is defined as a convex envelope. The cutter definition includes four types of surfaces: cylinders, cones, toruses, and spheres. The segments defining these surfaces are connected to one another so as to leave no unaccounted-for space.

Using the definition of the space curve, the location of the cutter (in X,Y,Z coordinates), and the cutter center axis orientation (expressed as a vector with components i,j,k), a directional vector and distance is computed such that moving the cutter as indicated will cause it to come into contact with the space curve. First, the cutter center is estimated as a starting point for an iterative process. The minimum distance from this point to the space curve is then computed. The tangent vector to the space curve is determined at this initial minimum distance curve point. A normal distance is computed from the cutter to the tangent line, and a cutter normal point established at the normal distance intersection with the cutter surface. The cutter point is used to define a plane passing through itself and the cutter's axis of rotation. This plane is extended to intersect with the space curve, and a new tangent line is computed at the point of intersection with the space curve. The process is then repeated until the new tangent vector and the old tangent vector are determined to be within some predefined tolerance from one another. The final normal distance from the cutter to the tangent vector is used as the normal distance to the space curve.

In the preferred embodiment, an additional process is added to further improve the result of the normal distance computations. A space curve normal plane is established at the final intersection point of the cutter normal and the space curve. The cutter normal is then projected into this plane to generate a space curve normal which is perpendicular to the space curve tangent but also in the cutter normal plane and as close to the cutter normal as possible.

FIGS. 1(a), 1(b), 1(c), 1(d) 1(e) show a series of three dimensional sketches illustrating the geometry involved in the computation of a normal distance to a surface in accordance with the prior art.

FIGS. 5(a), 5(b), 5(c), 5(d), 5(e) show a series of three dimensional sketches illustrating the geometry involved in the computation of a normal distance to a space curve in accordance with the present invention.

Figure 6:
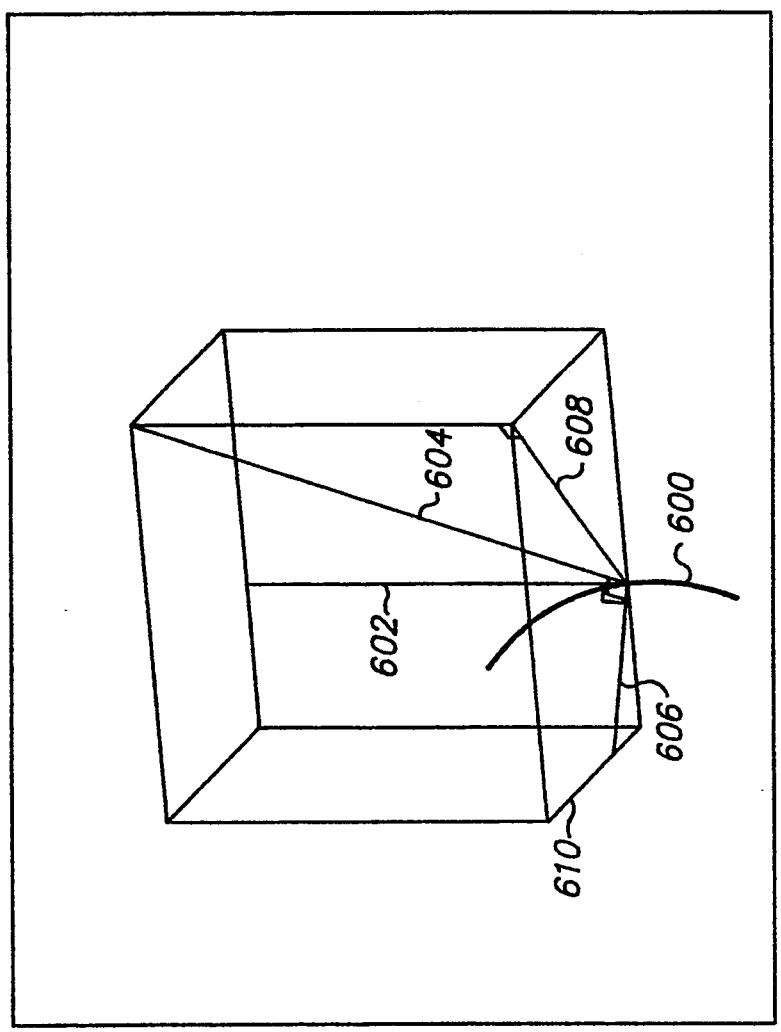

FIG. 6 is a three dimensional sketch illustrating the geometry involved in generating a cutter normal projection in accordance with the present invention.

Figure 7:
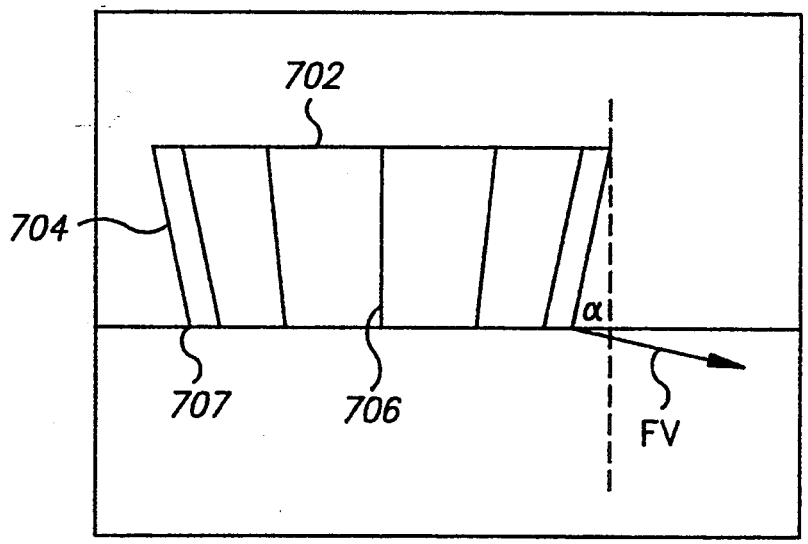

FIG. 7 is a two dimensional sketch illustrating the geometry involved in the computation of a normal distance to a line segment in accordance with the present invention.

Figure 8:
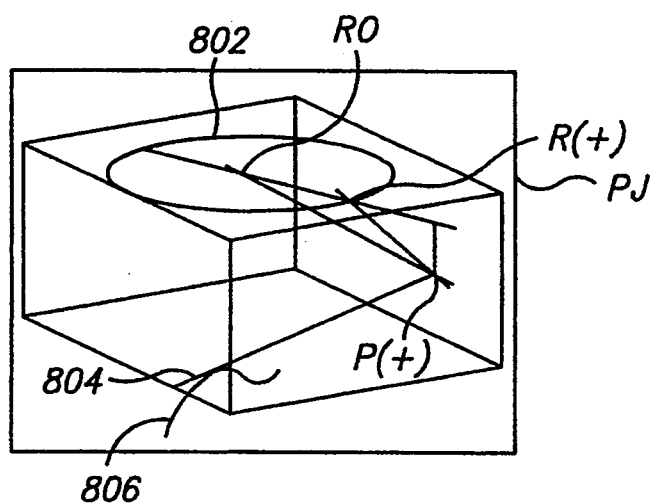

FIG. 8 is a three dimensional sketch illustrating the geometry involved in the computation of a normal distance to a circle in accordance with the present invention.

DETAILED DESCRIPTION OF INVENTION

I. CAM System

Figure 1A:
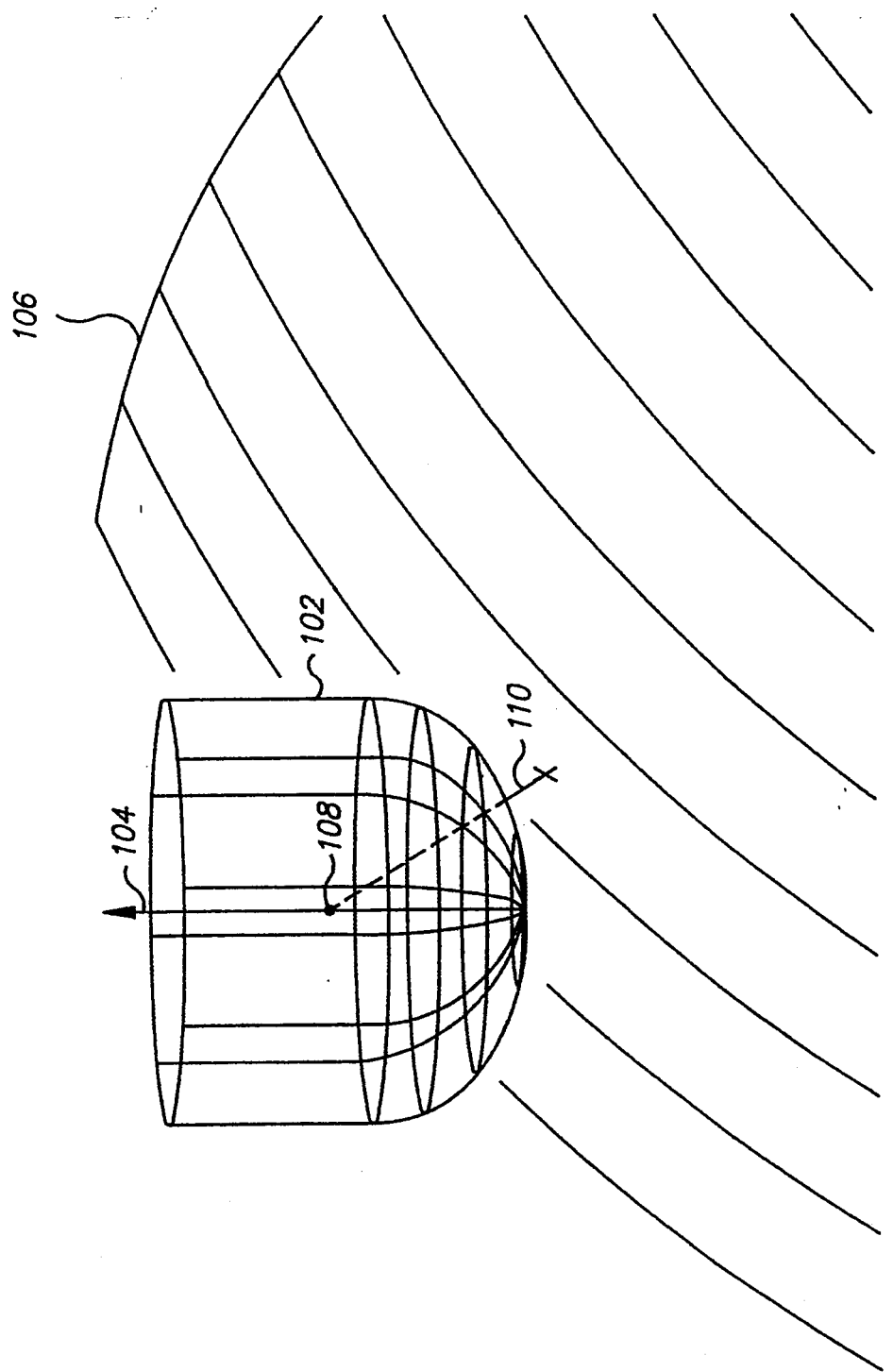
Figure 1B:
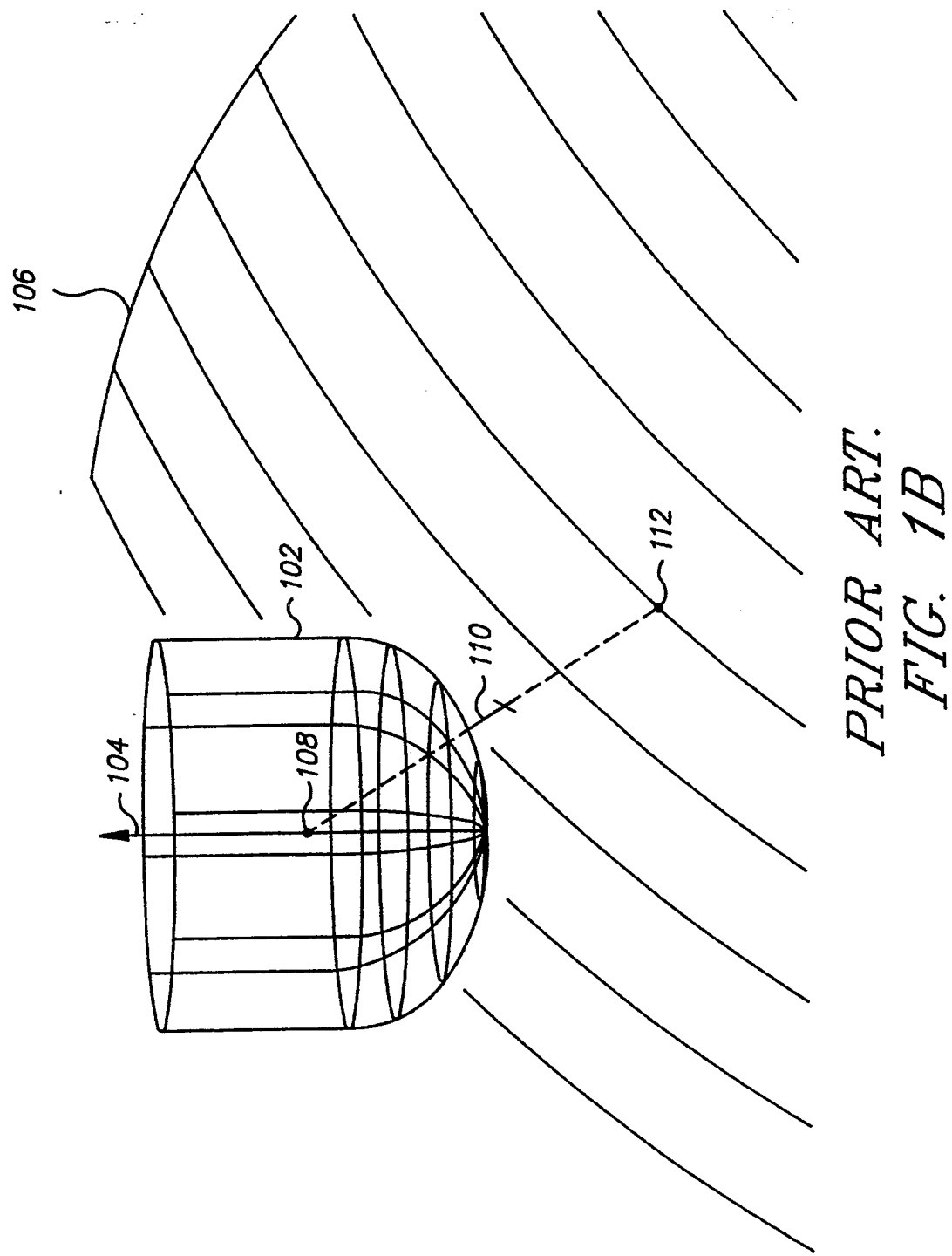
Figure 1C:
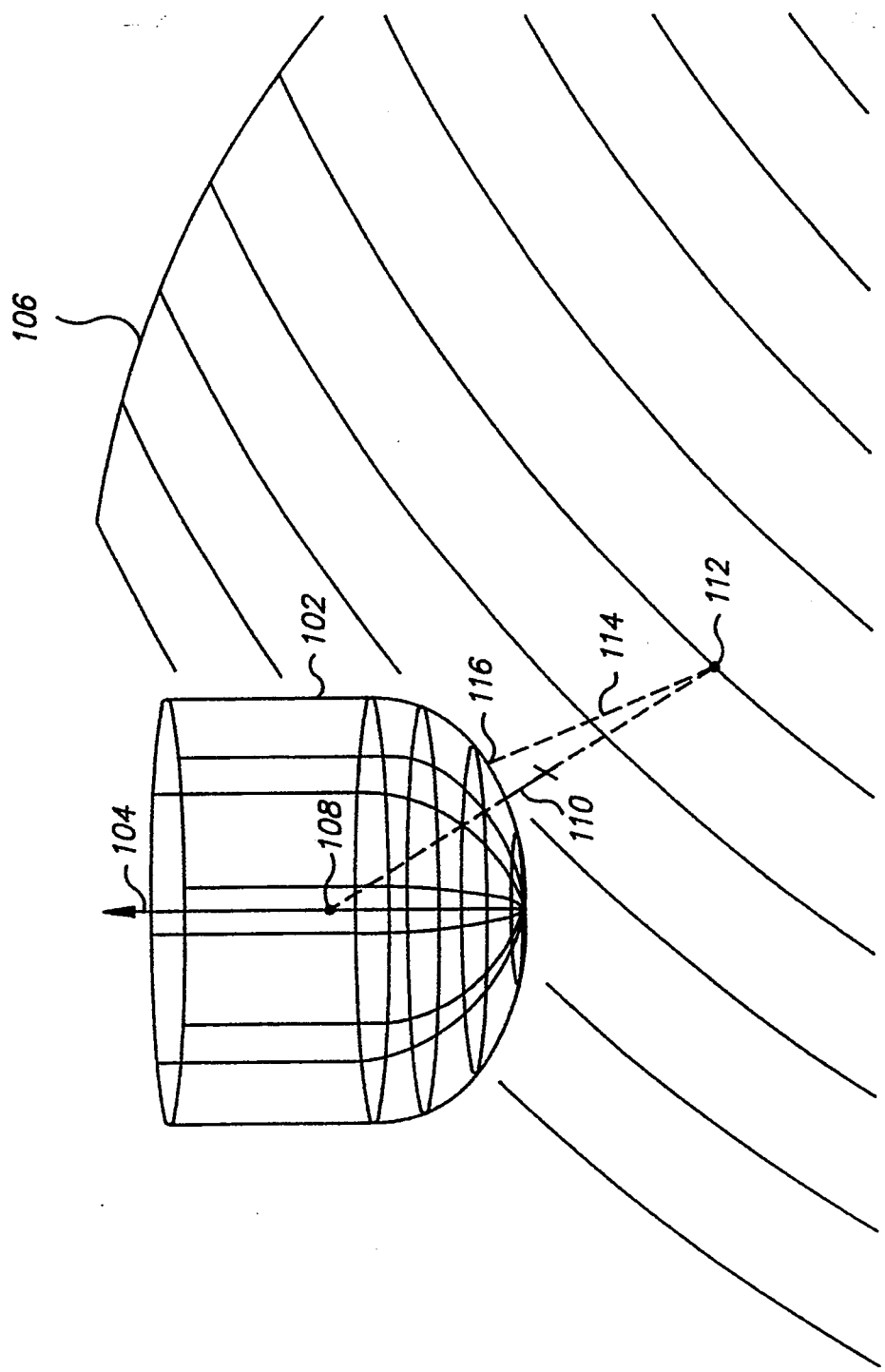
Figure 1D:
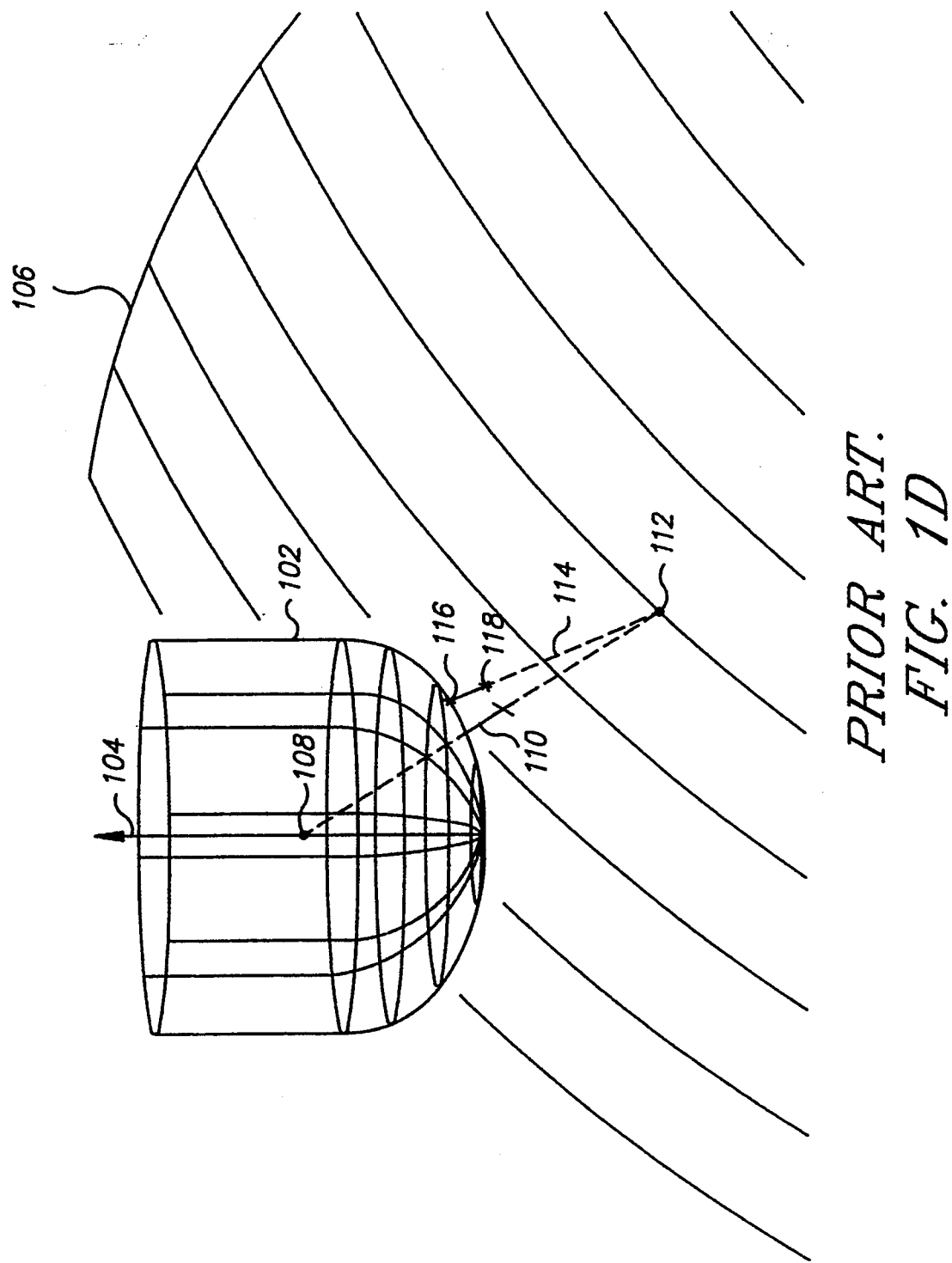
Figure 1E:
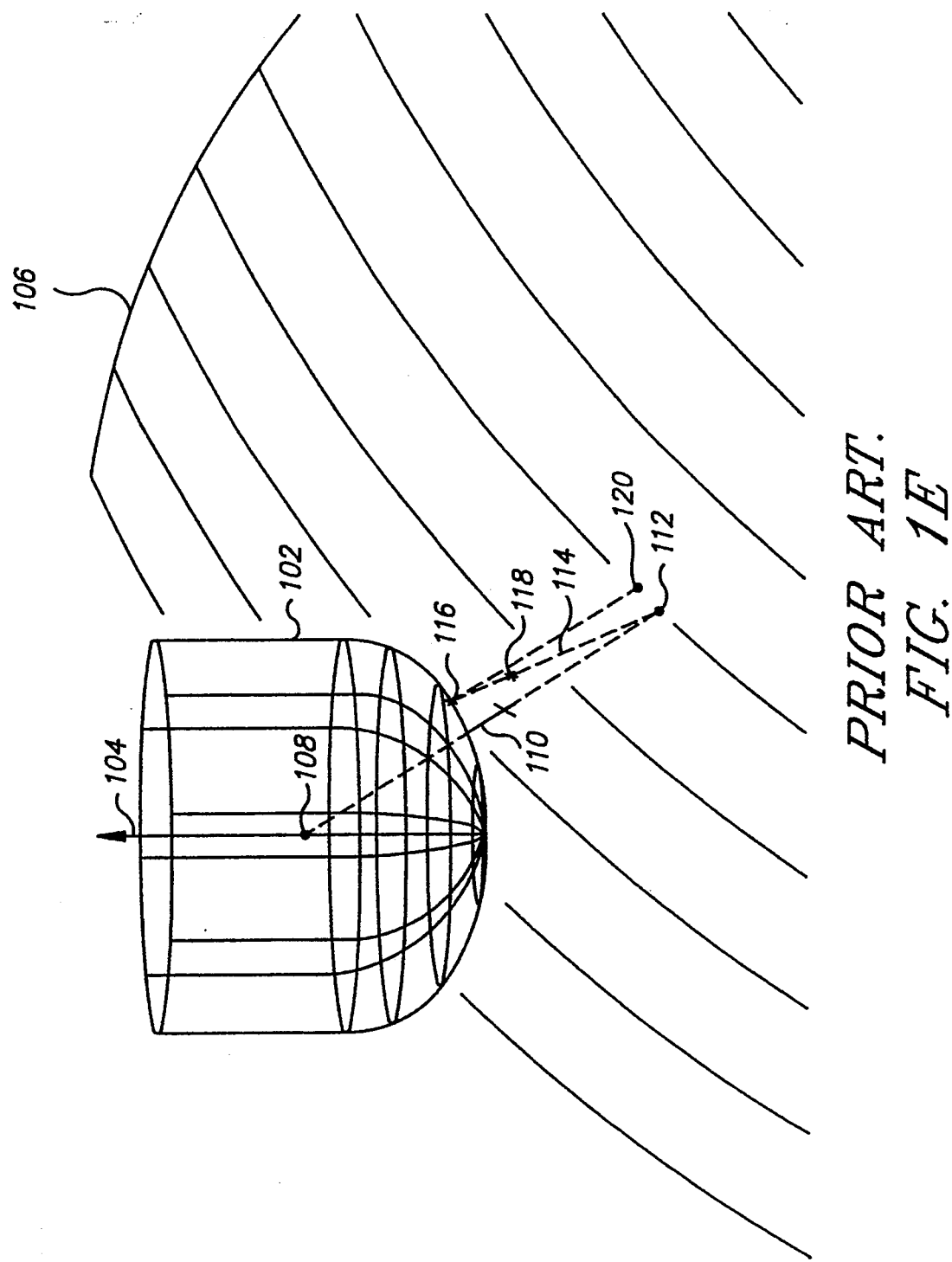
Figure 2:
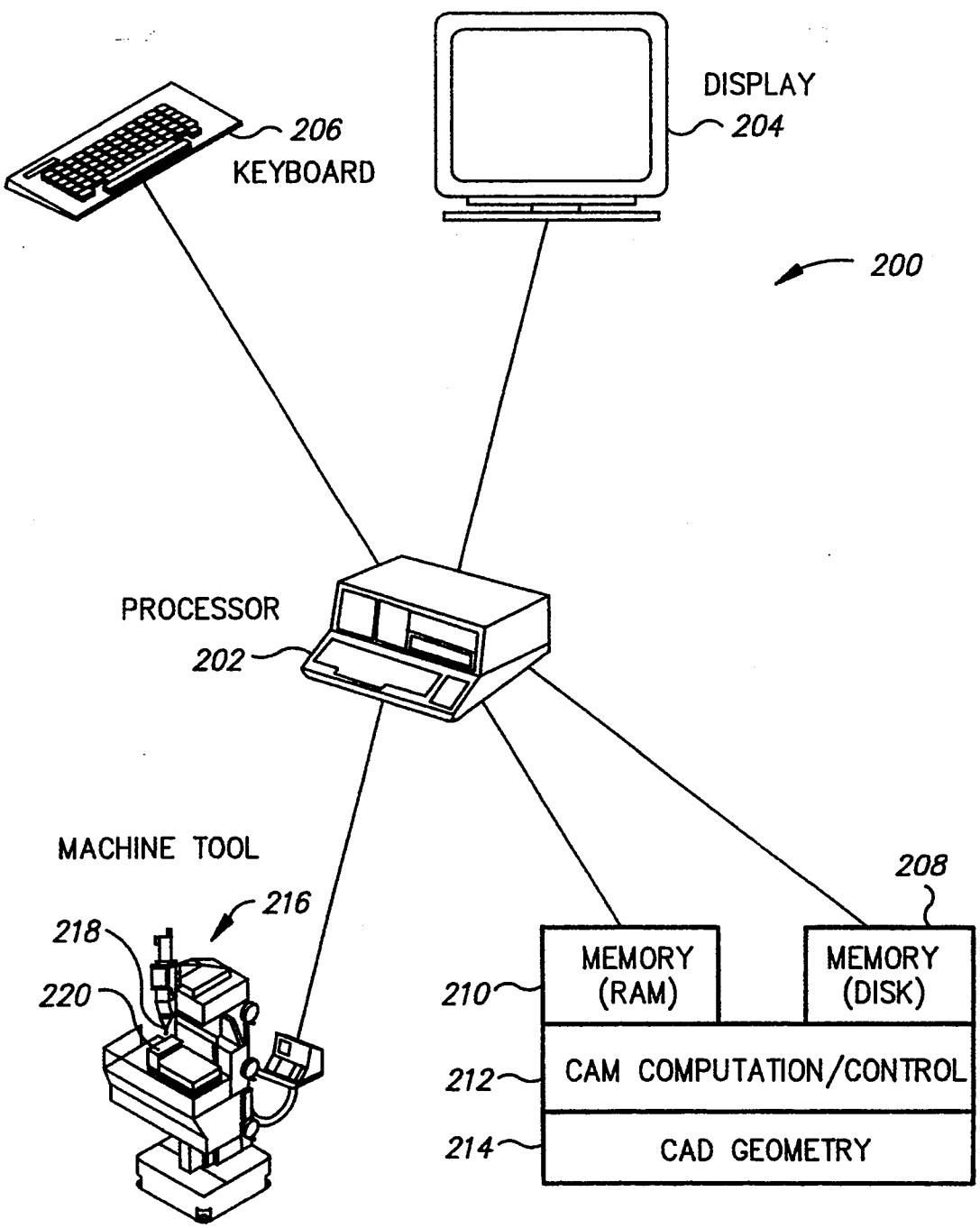
FIG. 2 is a block diagram illustrating the normal distance computation system of the present invention.

A high level view of the normal distance computation system of the present invention is shown in FIG. 2. A computer-based CAM system, shown generally at 200, is provided to control the operation and function of the invention. CAM system 200 includes processor 202, display 204, keyboard 206, bulk memory 208, system memory 210, and machine tool 216, which itself includes cutter 218 and workpiece (part) 220. System memory 210 typically comprises random access memory (RAM) into which portions of CAM computation and control programming 212 and CAD geometry 214 are loaded during execution, although execution from other storage media (e.g. ROM, bubble, EPROM, WORM, disk) is also feasible. Bulk memory 208 typically comprises one or more disk storage units into which portions of CAM computation and control programming 212 and CAD geometry 214 are stored while not in execution, although other storage media (e.g. tape, CD/ROM, large RAM array) is also feasible.

In operation, a user interacts with the system via keyboard 206. System responses and information are communicated via display 204. Data such as CAM computation/control program 212 and CAD geometry 214 is generally stored in bulk memory 208 or a larger, remotely attached disk storage subsystem (not shown), and then loaded into RAM 210 when accessed by processor 202. Processor 202 receives CAD geometry 214 describing the geometry of the part to be machined, as well as CAM computation/control instructions 212, including instructions needed to compute normal distances for space curves in accordance with the present invention. Processor 202 performs computations which generate NC data for use programming machine tool 216 to guide cutter 218. The NC data may be provided directly to machine tool 216, or optionally may be stored in any combination of memories 208 and 210 for later recall and use by machine tool 216. When the NC data is programmed into machine tool 216, it provides the information necessary to guide cutter 218 over part 220 so as to generate surfaces, contours, corners, and in accordance with the present invention, edges, as required to produce the machine part represented by CAD geometry 214.

II. Definition of Space Curve, Cutter

Prior to describing the positioning of a cutter to a space curve, it is necessary to summarize the geometrical and mathematical representations of the components to be positioned, that is the space curve and the cutter themselves. A space curve is a connected piece-wise C1 continuous curve. For example, a straight edge or a curved edge forms a space curve. Conversely, a space curve can be used to represent three sides of a rectangle, or a spline described in rational B-spline form.

A space curve can be represented mathematically using the equation: $P(t)=[X(t), Y(t), Z(t)]$ where $P(t)$ is a continuous 3D vector function. The derivative of $P(t)$, $P'(t)$, is continuous except at a finite number of points. Algorithms to evaluate $P(t)$, $P'(t)$ and to compute the minimal distance from a given point are readily available in the art, and accordingly will not be discussed in detail here.

Figure 3:
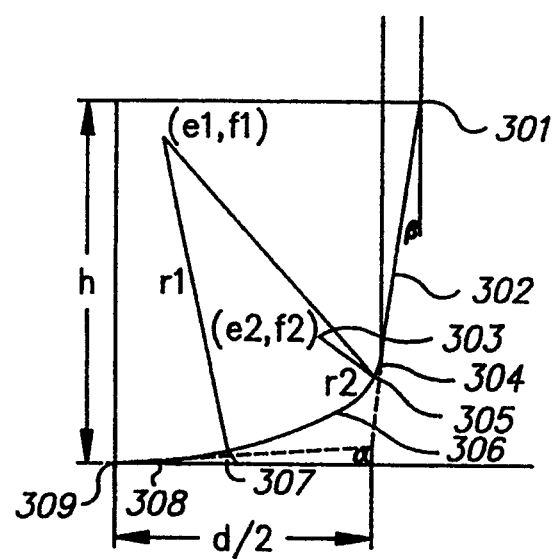
FIG. 3 is a dimensioned view of a cutter profile.

A cutter is a sharpened, hardened, machining device which spins at a high rate and is brought to bear on a workpiece to shape the workpiece into a machined part by removing excess material from the workpiece. The cutter is controlled by a computer positioning means which ensures highly accurate positioning of the cutter over the workpiece. The cutter itself can have a multiply contoured cutting surface, or profile. An example is shown in FIG. 3, where a cutter profile is illustrated including straight line segments 302 and 308, as well as circular segments 304 and 306. Mathematically, the cutter is described as a surface of revolution represented by ten parameters: $d$, $r1$, $e1$, $f1$, $r2$, $e2$, $f2$, $\alpha$, $\beta$, $h$. These parameters are depicted graphically with reference to the cutter shown in FIG. 3, and are defined as follows:

| Parameter | Definition |
| --- | --- |
| d | Width between the two intersections of lower line segments and upper line segments |
| r1 | Radius of lower filleted corner circle |
| e1 | Horizontal distance from center of lower filleted circle to vertical center line |
| f1 | Vertical distance from center of lower filleted circle to horizontal bottom line |
| r2 | Radius of upper filleted corner circle |
| e2 | Horizontal distance from center of upper filleted circle to vertical center line |
| f2 | Vertical distance from center of upper filleted circle to horizontal bottom line |
| $\alpha$ | Angle in degrees that cutter bottom line segment makes with horizontal bottom line; $\alpha$ must always be positive and less than 90 degrees |
| $\beta$ | Angle in degrees that cutter upper line segment makes with vertical or tool axis; absolute value of $\beta$ must be less than 90 degrees (when $\beta$ is negative, cutter becomes barrel shaped) |
| h | Height of cutter |

In operation, the connected line segments and circular segments rotate around the center axis of the cutter to form a cutter envelope. It is to be noted that the cutter shown is merely exemplary; the present invention is contemplated to function with any cutter having a surface of revolution including a combination of linear and circular segments revolving about a central axis to form a convex surface.

III. Normal Distance Computation for Space Curve

The present invention provides a methodology for computing an alias for the normal distance from a cutter to a space curve. In general, the technique centers around intersecting the space curve with the cutter normal plane to thus circumvent the limitation created by the space curve itself having no single surface normal. As will be shown in a subsequent section, the algorithm can be further improved by selecting a particular space curve normal using a projection of the cutter normal into the normal plane of the space curve. The computational model of the present invention thus takes advantage of an important dualism apparent in solid geometry, namely that a tool normal intersecting a part surface can be replaced with a cutter plane intersecting a space curve.

Figure 4:
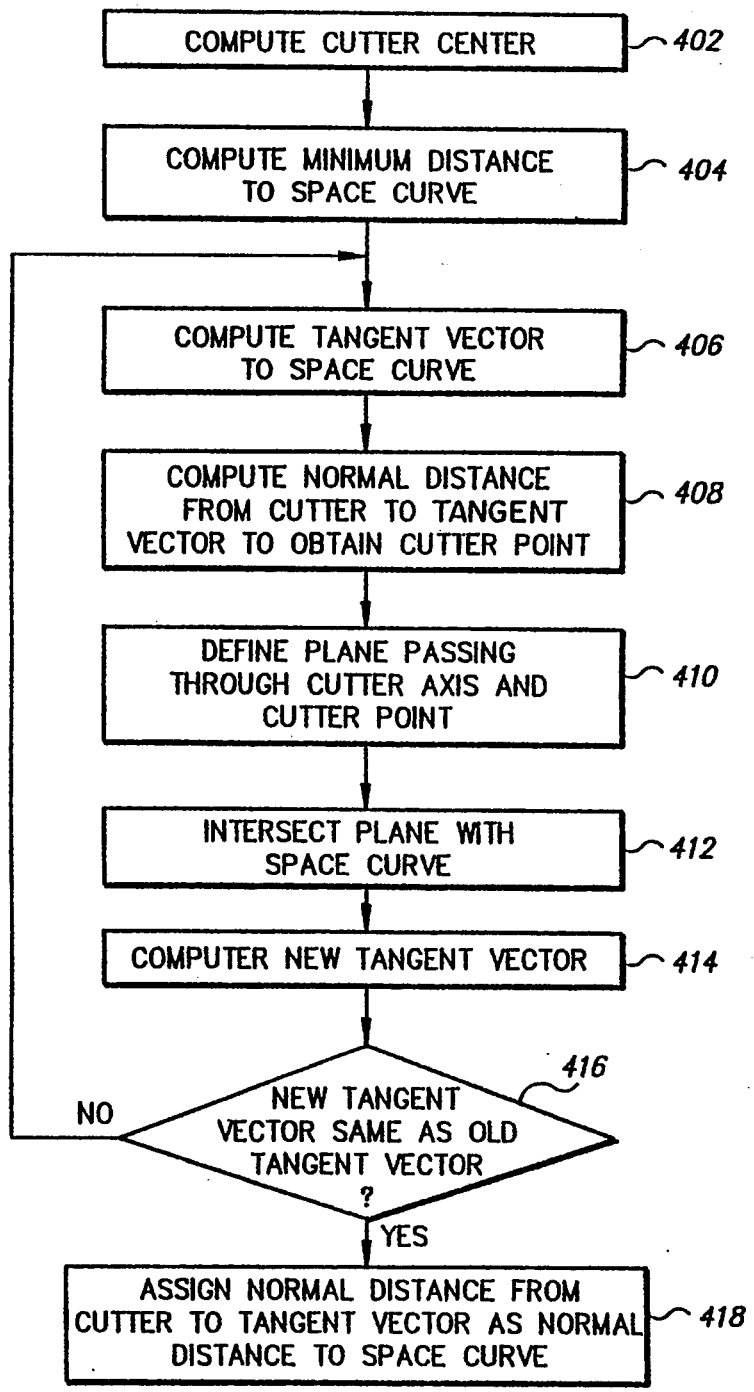
FIG. 4 is a flowchart illustrating normal distance computation to a space curve in accordance with the present invention.

Shown in FIG. 4 is a flowchart representing the methodology for computing an alias for the normal distance from a cutter to a space curve in accordance with the present invention. The flowchart depicts an iteration of a process which comprises: 1) constructing a space line tangent to the space curve; 2) computing a cutter point on the cutter surface; and 3) intersecting a cutter plane defined by the cutter center of rotation and the cutter point with the space curve to generate a reference point for a new tangent space line. The details of the process begin with 402, where the cutter center is computed. In the preferred embodiment this computation is merely a rough estimate of the cutter center determined as the vertical midpoint of the cutter along its center of rotation. However, many other suitable techniques well known in the art are available to generate this computation. The result is used at 404 to compute a minimum distance to the space curve. The minimum distance computation is also intended to be a rough surrogate for the normal distance, which is the sought-after final result. The minimum distance provides a starting point for the iteration process. At 406, the minimum distance point on the space curve is used to generate a tangent vector to the space curve at this point. This tangent vector, in conjunction with the point, defines a space line. At 408, the normal distance between the space line and the cutter is computed. At the point where the normal distance intersects the cutter, a cutter point is defined. At 410, a plane is defined using the cutter point and the rotation axis of the cutter. At 412, this plane is extended to its intersection with the space curve. The space curve may intersect the plane at several points. In this case the intersection point closest to the normal distance point on the space line is carried forward in the subsequent computations. The intersection point is used at 414 to compute a new tangent vector (space line) to the space curve. At 416, the description of the new tangent vector is compared with that of the old tangent vector. If the two descriptions match one another or are within some predefined tolerance, 418 is executed to assign the normal distance from the cutter to the new tangent vector as the alias for the normal distance between the cutter and the space curve. If the two descriptions are not within the acceptable tolerance, steps 406 to 416 are repeated using the new tangent line until sufficient accuracy is achieved. In the preferred embodiment, the tolerance required for sufficient accuracy is established as that which enables a user to match their chosen CAM specifications.

Figure 5E:
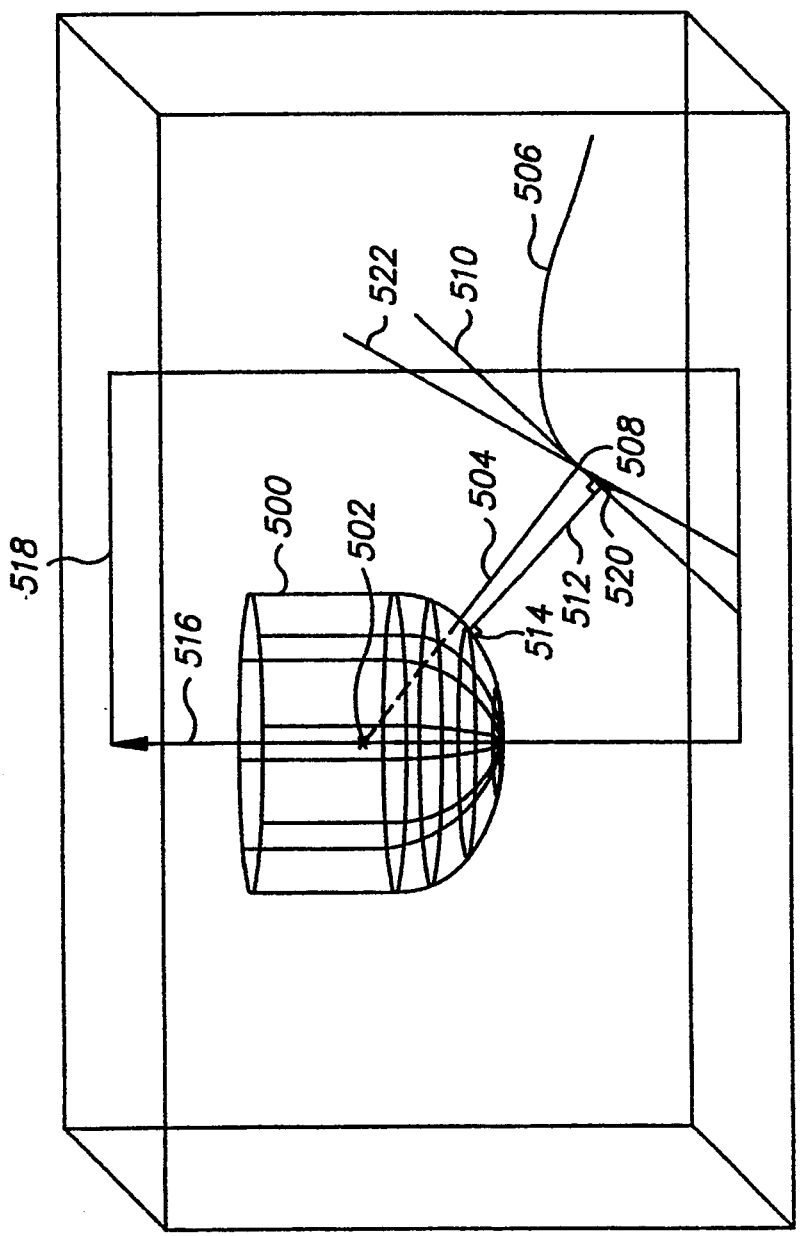

FIGS. 5(a)–5(e) illustrate the visual geometry involved in the computations described with reference to FIG. 4. 5(a) to 5(d) correspond with 404 to 410, respectively, while FIG. 5(e) corresponds with 412 and 414. As shown in FIG. 5(a), cutter center 502, computed previously based on cutter 500, is used to compute distance 504, the shortest distance to the space curve 506. In FIG. 5(b), shortest distance point 508 is used to compute tangent line 510. In FIG. 5(c), normal distance 512 is computed between tangent line 510 and cutter 500. In FIG. 5(d), the normal distance point on cutter 500, cutter point 514, together with cutter axis of rotation 516, is used to define cutter plane 518. Finally, in FIG. 5(e), cutter plane 518 is intersected with space curve 506 to define point 520, which is used to compute new tangent vector 522. As described previously, tangent vector 522 is compared with tangent vector 510, and the process is repeated until the tangent vectors converge upon one another.

Implementation Details

The normal distance computation algorithm is initialized by computing the center point of the cutter at a given cutter end point and the tool axis orientation. The center point is either the tool end point plus half of the cutter height times the tool axis vector, or the maximum radius of the cutter. The computations proceed as described previously. During normal distance computation, for a space line which defines a combination of connected piece wise C1 continuous curve segments, the connection point (where the tangent vector is not defined) is treated as a separate segment.

One of the component operations required to perform the normal distance computations described above is the computation of the minimal distance from a space curve to a point. Mathematically, a curve is defined as:

$$P(t) = [X(t), Y(t), Z(t))]$$

$$P'(t) = \frac{dP(t)}{dt} = \left[ \frac{dX(t)}{dt}, \frac{dY(t)}{dt}, \frac{dZ(t)}{dt} \right]$$

Given point PO the goal is to minimize the scalar function:

$$S(t) = (P(t) - PO) \cdot (P(t) - PO)$$

The dot in the equation refers to the dot product of two vectors. Newton's method can be used to minimize S(t). To initialize Newton's method, in an interval $t_N \geq t \geq t_1$, the interval is subdivided into N sub-intervals and intermediate points are computed using $$[P(t_k)]_{k=1}^{k=N} \cdot t_i \text{ is chosen such that}$$

$$|P(t_i) - PO| = \min{[|P(t_k) - PO|]_{k=1}^{k=N}}$$

$t_i$ itself is used as the initial value for the above computations.

The values for t are computed using the Newton-Rapfson algorithm as follows:

$$t_{n+1} = t_n - \frac{S(t_n)}{S'(t_n)}$$

One of the central steps of the normal distance computation process described above is the computation of the intersection of a space curve and a plane. The method selected in accordance with the present invention is known as the Newton method. The space curve is defined as:

$$P(t) = (X(t), Y(t), Z(t))$$

$$P'(t) = \frac{dP(t)}{dt} = \left( \frac{dX(t)}{dt}, \frac{dY(t)}{dt}, \frac{dZ(t)}{dt} \right)$$

Both P(t) and P'(t) are continuous. The coefficients for the plane are defined as (A, B, C, D). All points on the plane must satisfy the equation: $A \times X + B \times Y + C \times Z - D = 0$. It is further required that (A, B, C) be a unit vector, denoted as PN. At the intersection of the space curve and the plane, the point on the space curve satisfies the scalar equation:

$$S(t) = A \times P_1(t) + B \times P_2(t) + C \times P_3(t) - D = 0$$

or $$PN \cdot P(t) - D = 0.$$

To initialize the iteration, an interval $t_N \geq t \geq t_1$, is sub-divided into N sub-intervals, and intermediate points are computed using $$[P(t_k)]_{k=1}^{k=N} = [F(t_k)]_{k=1}^{k=N} \cdot t_i \text{ is defined such that:}$$

$$|P(t_i) \cdot PN - D| = \min{[|P(t_k) \cdot PN - D|]_{k=1}^{k=N}}$$

$t_i$ is then used as the initial value for the computation of:

$$t_{n+1} = t_n - \frac{S(t_n)}{S'(t_n)}$$

The algorithm converges locally for all Newtonian if an intersection actually exist. Tangency and degenerate cases must be handled using special-case logic which is well known in the art.

IV. Cutter Normal Projection

The normal distance computation method described above produces a close estimate of the normal distance to the space curve. However, because the method measures the normal distance from the tangent line rather than from the space curve itself, the result will contain an inherent inaccuracy that may be unacceptable for certain parts requiring extremely precise cutter positioning to a space curve. Therefore, in accordance with the preferred embodiment, an additional process is applied to the final result of the normal distance computation described above to generate a highly precise normal distance between the cutter and the space curve. The approach generally centers around projecting the cutter normal into the normal plane defined at the final intersection point determined on the space curve. This generates a surface normal alias perpendicular to the space curve tangent but as close to the cutter normal as possible.

More particularly, the starting point for cutter normal projection is the final cutter normal distance, along with the final space curve tangent vector. The cross-product is computed for the final space curve tangent vector and the final cutter normal (from the cutter normal distance). The result is a vector which is normal to the final tangent vector and in the normal plane of the space curve at the final tangent point. Then a second cross-product is computed for the result of the first cross-product and the final tangent vector. The geometry involved in these calculations is shown in FIG. 6, where the space curve is shown at 600. The cross-product of tangent vector 602 and cutter normal 604 produces vector 606, which is crossed again with tangent vector 602 to produce vector 608, which is the projection of cutter normal 604 into space curve normal plane 610.

Implementation Details

Projection of the cutter normal involves computation of a surface vector (SV). SV is the cross product of the curve tangent vector and a vector which is the cross product of the cutter normal vector and the space curve tangent vector, expressed mathematically as follows.

$$SV = P(t) \times (P'(t) \times CN).$$

SV is perpendicular to the curve tangent and SV is perpendicular to the cross product of the part surface (PS) and the drive surface (DS). Either of SV or −SV may be used to represent SN. For PS or DS normal distance computation, SN will always point to the cutter axis. For check surface (CS) computation, SN will point in the direction of cutter motion if the cutter is moving TO or ON the part surface, but will point away from the forward direction if the cutter is moving PAST the part surface.

V. Cutter Segmentation

In the foregoing description it has been assumed that the cutter used to generate the cutter normal distance could be described by a single mathematical expression, and hence would always produce a normal vector capable of intersecting the space line. However, this typically is not the case, as the cutter normally includes several curved and several linear segments, and hence requires several expressions for its complete description. Accordingly, additional logic can be added to the normal distance computation algorithm in order to handle a segmented cutter.

When a segmented cutter is involved in a normal distance positioning computation, prior to computing any normal distances from the cutter it must be broken into its basic segments. Each segment will be either a straight-line segment or a circular segment. A corner or segment division is represented as a circular segment having zero radius. Once the cutter has been segmented, each segment is rotated about the rotation axis of the cutter to produce a solid. A line segment rotates into a frustum (such as a cylinder or a cone, depending on its orientation), while a circular segment rotates into a portion of a torus or sphere. An example is shown in FIG. 3, which was discussed previously. The depicted cutter includes four segments, straight lines 302 and 308, along with circular segments 304 and 306. Points 301, 303, 305, 307, and 309 are segment divisions. The labelled geometry is used to compute a solid of revolution for each segment.

When the normal distance computations are generated, a normal distance is computed from each segment of the cutter to the space line. For most segments in a typical configuration it will not be possible to compute a normal distance, because no cutter surface normal for the segment will intersect the space line. These segments are disqualified from the computation. However, at least one segment will generate a normal distance (in fact, two normal distances, one for each side of the cutter). If only one segment generates a normal distance, this is used in the subsequent computations as described previously. If more than one segment generates a normal distance, the segment having the shorter distance is chosen, and that distance is used in the subsequent computations.

Implementation Details

As the cutter is analyzed, and each segment is stored in a table as either a line segment or a circular arc. The data is stored in the local coordinate system of the cutter, defined as the location where the X and Y planes intersect the cutter through the tool axis. The data stored in the table is as follows:

For each line segment
the X and Y coordinate of the lower end point of the line segment.
the sine and cosine values of the angle the segment makes with the X axis.
the length of the line segment.

For each circular arc segment:
the X and Y values of the circular center.
The cotangent of the angle between the vector formed by the lower end point and the center of the circular arc and the tool axis (0, 0, 1) (stored as COT1).
The cotangent of the angle between the vector formed by the upper end point and the center of the circular arc and the tool axis (0, 0, 1) (stored as COT2).
The radius of the circular arc (stored as R2). The intersection of two segments where there is no $C^1$ continuity is stored as a circular arc segment with zero radius.

The method for determining which segment(s) are to be used in the normal distance computations uses the cutter center point and the cutter axis through (0,0,8) and (0, 0, 1) to form a plane. In this plane, for each circular arc segment the line passing through the circular arc center and the cutter centerpoint are used to intersect the circular arc. If an intersection exists, it is a candidate for the cutter normal and subsequent normal distance iteration. For each line segment, the curve point is projected vertically onto the line segment. If the projection point is within the line segment, that point is a candidate for cutter normal (CN). This candidate is called the cutter point (CP).

The acceptance criteria for a candidate point to become CN is as follows: define P(t) to be a connecting point for curve segment 1 and and curve segment 2, where the space line is not C1 continuous at P(t). Further, define V1=P′−(t) to be the tangent vector for segment 1 at P(t) and V2=P′+(t) to be the tangent vector for segment 2 at P(t). Vector V is constructed by computing surface normal (SN)=CP−P(t), V=(SN×P′−(t)) X SN.P(t), V1 and V2 form a plane. V is projected into this plane; the result is referred to as V′. U1=V1×V′ and U2=V′×V2. CP is accepted as the cutter point for the cutter if U1·U2 is non-negative. The vector perpendicular to V′ in this plane is chosen as the SN at t.

If the cutter is to be positioned TO the part, the above algorithm will search for a minimal distance. If the cutter is to be positioned PAST the part with respect to the direction or motion, the algorithm will search for a maximal distance.

One component operation required to perform the normal distance computations using a segmented cutter is the computation of the normal distance from a cutter line segment to a space line. To compute the normal distance for each line segment the following data are required:
the length or the cutter line segment (L).
the X and Y coordinates of the lower end point of the line segment.

the sine and cosine values of the angle between the segment and the X axis (SINL and COSL).

When the line segment is rotated around the cutter center axis, the surface formed is a frustum. An example is shown in FIG. 7, where surface 702 is formed by rotating line segment 704 about cutter axis (CA) 706. The cutter center axis is represented by the cutter end point (CE) 707 and CA 706. The space line to which the normal distance is sought is represented by a point $P(t_1)$ and a vector $P'(t_1)$ (not shown in the figure). A local coordinate system is chosen, in which CE is the center, the Z axis is CA, the Y axis is perpendicular to both CA and $P'(t_1)$ (their cross product), and the X axis is Y cross Z. $P(t_1)$ and $P'(t_1)$ are transformed into this system. For ease of reference, P(t) and P'(t) are denoted using:

$$P(t_1) = [X_1, Y_1, Z_1]$$

$$P'(t_1) = [I_1, J_1, K_1]$$

Because P'(t) is perpendicular to Y, J=0. The point and vector of the frustum are selected as the normal distance $FP = (FP_1, FP_2, FP_3)$ and $FV = (FV_1, FV_2, FV_3)$. The geometry of this computation is shown in FIG. 7. Both P'(t) and FV are required to be unit vectors. Since FV must be normal to the frustum, $FV_3 = -SINL$. Since P'(t) is perpendicular to FV, $$FV_1 \times I + FV_2 \times J + FV_3 \times K = 0.$$

Because J=0, $FV_1 \times I + FV_3 \times K = 0$, or $$FV_1 = \frac{SINL \times K}{I}$$

Because FV is a unit vector, $$FV_2 = \pm \sqrt{FV_1^2 + FV_3^2}$$

The ± sign provides some freedom to choose the side of the cutter for which the normal distance is sought. Definitionally, V1 = vector $(FV_1, FV_2, 0)$, SIDEV is the normalized vector of V1, and $P1 = X \times SIDEV + (O, O, Y)$ is a point on the base of the frustum. The line segment at P1 is $V1 = SIDEV + (O, O, SINL)$. Given this information, the minimum distance between the two space lines (P1, V1) and (P(t), P'(t)) and the pair of points on these two space lines is easily computed. The point on (P1, V1) is denoted as CP. If CP is in the line segment from P1 in the direction V1 at length L, then a normal distance has been found, and is the minimal distance between these two space lines. The points on the frustum and cutter normal are CP and CN.

A second component operation required to perform the normal distance computations for a segmented cutter is the computation of the normal distance from a cutter circular arc segment to a space line. To compute the normal distance for each circular arc segment the following data are required:
the X and Y value of the circular arc center.
The cotangent of the angle between the vector formed by the lower endpoint and the center of the circular arc and the tool axis (0, 0, 1), stored as COT1.
The cotangent of the angle between the vector formed by the upper endpoint and the center of the circular arc and the tool axis (0, 0, 1), stored as COT2.

The radius of the circular arc, stored as R2.
When the arc rotates about the tool axis, the locus of (R1, H) forms a ring which is the center axis of a torus. The locus of the arc is the part of the torus defined as a segment of the cutter.
For the space line:
$P(t_1)$ is a point on the space line.
$P'(t_1)$ is the directional vector of the space line. It is required that $P'(t_1)$ be a unit vector.
At the pair of points representing the normal distance between the space line and the torus (SP, CP), the line passing through SP and CP also intersects the center ring axis of the torus at a point denoted as RP. In fact, SP and RP form a pair of points denoting the normal distance from the space line to the ring center. The problem is therefore reduced from one of computing the normal distance between a torus and a space line to one of computing the normal distance between a ring and a space line. The ring center is defined by a radius R1 and a height H (the height above the cutter end).

Two methods are available for computing the normal distance between a space line and a ring. The first is analytic, the second iterative. The first method begins by choosing a local coordinate system, with CE at the center, CA on the Z axis, and the Y axis oriented perpendicular to both CA and $P'(t_1)$ (their cross product). The X axis is Y cross Z. $P(t_1)$ and $P'(t_1)$ are transformed into this system.

$$P(t) = [X, Y, Z]$$

$$P'(t) = [I, J, K]$$

Points on the spaceline are parameterized as follows:
$P(t) = P(t_1) + t \times P'(t_1) = [X + t \times I, Y + t \times J, Z + t \times K]$
J=0, therefore
$P(t) = [(X + t \times I, Y, Z + t \times K)]$
As shown in FIG. 8, at a point P(t) for a given t, the geometry requires that in the plane of the ring (Z=H), the center of the ring is RO = (O,O,H) and PJ(t) is the projection of P(t) onto this plane.
$PJ(t) = (X + t \times I, Y, H)$
The line passing through RO and PJ(t) intercepts the ring at point R(t).

FIG. 8 shows the orientation of three right angle triangles formed by RO, R(t), PJ, and P(t) for circle 802 and tangent line 804 to space curve 806. With reference to the right angle triangle (RO, P(t), PJ(t)), the length of side RO to PJ(t) is defined as LJRO, the length of side PJ(t) to P(t) is defined as LJP, and the length of side P(t) to RO is defined as LPRO. Using the Pythagorian Theorem, $LJRO^2 = LPRO^2 - LJP^2$ With reference to the right angle triangle (R(t), P(t), PJ(t)), the length of side R(t) to PJ(t) is defined as LJR(t), the length of side PJ(t) to P(t) is defined as LJP, and the length of side P(t) to R(t) is defined as LPR(t). Using the Pythagorian Theorem, $$LPR(t)^2 = LJP^2 + LJR(t)^2$$

$$LJP^2 = (PJ(t) - P(t)) \cdot (PJ(t) - P(t)) =$$

$$(H - (P(t)_3 - t \times P'(t)_3))^2$$

$$LJR(t)^2 = (LJR0 - R1)^2$$

$$LJR0 = \sqrt{(PJ(t) - R0) \cdot (PJ(t) - R0)} = \sqrt{(X + t \times I)^2 + Y^2}$$

-continued $$LJR(t)^2 = (LJR0 - R1)^2 = (\sqrt{(X + t \times I)^2 + Y^2} - R1)^2$$

$$LPR(t)^2 = (H - (Z - t \times K))^2 - (\sqrt{(X + t \times I)^2 + Y^2} - R1)^2$$

Let $S(t) = LPR(t)^2$:

To compute the points P(t) where the normal distance to the ring exists requires solving the equation:

$$S'(t) = \frac{dS(t)}{dt} = 0$$

This equation is a fourth order polynomial, after expansion. It can be solved by a number of root-finding algorithms known in the art. There can be from 0 to 4 roots for the polynomial. The computed points $P(t_i)$ of the roots form vectors together with the points on the ring $R(t_i)$. The cotangent of the angle between the vectors $R(t_i)$ and $P(t_i)$ must be within the range of the interval COT1 to COT2 to be accepted as a point on the cutter envelope.

The second method for determining the normal distance between a ring and a space line is the iterative approach. To initialize this algorithm, a point on the space line P(t) is determined such that it is at the minimal distance to the center of the ring (O, O, H). This point is denoted as $P_{(0)} = (X_0, Y_0, Z_0)$ A definition is assigned for:

$$LP_n = \sqrt{(X_n^2 + Y_n^2)}$$

$$V_n = \frac{R1}{LP_n}(X_n, Y_n, 0)$$

$$R_n = V_n + (0, 0, H)$$

$R_n$ is a point on the ring.

$R_n$ is used to compute the minimal distance to P(t). $P_{n+1}$ is defined as the point on P(t) at which this minimal distance occurs. The process is then repeated until the distances from $R_n$ to $R_{n+1}$ and from $|t_{n+1} - T_n|$ are less than the predefined tolerance. The distances between, the last pair of R and P provide the sought-after minimum. This approach is stable and convergent, and is superior in result to the analytical method.

VI. Conclusion

While the invention has been described in the context of positioning a cutter relative to a workpiece, it is to be noted that numerous additional applications exist which could make use of the normal distance computation methodology described herein. For instance, the invention is readily applicable to machining any bounded surface—that is, any surface having edges. It can also be used to compute a minimal distance between three-dimensional objects which include space curves, arrange (or nest) geometrical objects (parts) on a workpiece so as to achieve the most efficient possible use of the workpiece, and position a cutter to two edges simultaneously.

Using the foregoing specification, the invention may be implemented via standard programming and/or engineering techniques. The resulting program(s) may be stored on disk, diskettes, memory cards, ROM or any other memory device. For execution, the program(s) may be copied into the system memory (RAM) associated with the CPU. One skilled in the art of computer science will readily be able to combine the software created as described with appropriate general purpose or special purpose computer hardware to create a computer system embodying the invention. While the invention has been particularly described and illustrated with reference to a preferred embodiment, it will be understood by those skilled in the art that changes in the description or illustrations may be made with respect to form or detail without departing from the spirit and scope of the invention.

What is claimed is:

1. In a computer system having a processor and associated memory, a method for computing a normal distance from a cutter to a space curve for shaping a workpiece, comprising the steps of:
   (a) computing a minimum distance from the cutter to the space curve;
   (b) computing a first tangent line to the space curve at the minimum distance point on the space curve;
   (c) computing a normal distance from the cutter to the first tangent line;
   (d) defining a cutter plane passing through the rotation axis of the cutter and the normal distance point on the cutter;
   (e) intersecting the cutter plane with the space curve to define a cutter normal to the space curve
   (f) computing a second tangent line to the edge at the normal point on the edge and replacing the first tangent line with the second tangent line, and
   (g) repeating steps (c) to (f) until the first and second tangent lines converge to within a predetermined tolerance
   (h) automatically moving the cutter with respect to the workpiece in a direction defined by the computed normal distance.

2. The method as recited in claim 1, further comprising, prior to (a), computing a cutter center for use in the minimum distance computation of (a).

3. The method as recited in claim 1, further comprising:
   (h) projecting the cutter normal into a normal plane to the space curve for shaping a workpiece
   (h) automatically moving the cutter with respect to the workpiece in a direction defined by the computed normal distance.

4. The method as recited in claim 3, wherein the normal plane to the edge is selected at the final intersection point of the cutter plane and the edge.

5. The method as recited in claim 3, wherein (h) further includes
   (i) computing a cross product of the cutter normal with any of the first and second tangent lines,
   (ii) computing a cross product of the result of (i) with any of the first and second tangent lines.

6. The method as recited in claim 1 further comprising, prior to (a):
   dividing the cutter profile into a plurality of segments, including straight line segments and circular segments;
   rotating each segment about the rotation axis of the cutter to generate a solid of revolution for each segment; and
   in (c), computing a normal distance from each cutter segment to the first tangent line and selecting the shortest normal distance to generate the normal distance point on the cutter.

7. A computer-based system for computing a normal distance from a cutter to a space curve, comprising:
   (a) means for computing a minimum distance from the cutter to the space curve;
   (b) means for computing a first tangent line to the space curve at the minimum distance point on the space curve;
   (c) means for computing a normal distance from the cutter to the first tangent line;
   (d) means for defining a cutter plane passing through the rotation axis of the cutter and the normal distance point on the cutter;
   (e) means for intersecting the cutter plane with the space curve to define a cutter normal to the space curve;
   (f) means for computing a second tangent line to the edge at the normal point on the edge and replacing the first tangent line with the second tangent line, and
   (g) means for repeating (c) to (f) until the first and second tangent lines converge to within a predetermined tolerance.

8. The system as recited in claim 7, further comprising means for computing a cutter center for use in the minimum distance computation of (a).

9. The system as recited in claim 7, further comprising:
   (h) means for projecting the cutter normal into a normal plane to the space curve.

10. The system as recited in claim 9, wherein the normal plane to the edge is selected at the final intersection point of the cutter plane and the edge.

11. The system as recited in claim 9, wherein (h) further includes
   (i) means for computing a cross product of the cutter normal with any of the first and second tangent lines,
   (ii) means for computing a cross product of the result of (i) with any of the first and second tangent lines.

12. The system as recited in claim 7, further comprising, prior to (a):
   means for dividing the cutter profile into a plurality of segments, including straight line segments and circular segments;
   means for rotating each segment about the rotation axis of the cutter to generate a solid of revolution for each segment; and
   in (c), means for computing a normal distance from each cutter segment to the first tangent line and selecting the shortest normal distance to generate the normal distance point on the cutter.

13. A computer-aided manufacturing control system comprising:
   means for receiving a geometrical representation of a computer-designed part, the representation including a part edge;
   means for providing numerical control data to a machine tool to guide a cutter in correspondence with the geometrical representation of the part, the numerical control data including data to guide the cutter to the edge of the part; and
   means for generating the numerical control data based on the geometrical representation, including means for generating the data to guide the cutter to the edge of the part by
   (a) computing a minimum distance from the cutter to the space curve;
   (c) computing a first tangent line to the space curve at the minimum distance point on the space curve;
   (c) computing a normal distance from the cutter to the first tangent line;
   (d) defining a cutter plane passing through the rotation axis of the cutter and the normal distance point on the cutter;
   (e) intersecting the cutter plane with the space curve to define a cutter normal to the space curve;
   (f) computing a second tangent line to the edge at the normal point on the edge and replacing the first tangent line with the second tangent line, and
   (g) repeating (c) to (f) until the first and second tangent lines converge to within a predetermined tolerance.

14. The system as recited in claim 13, further comprising means for computing cutter center for use in the minimum distance computation of (a).

15. The system as recited in claim 13, comprising:
   (h) projecting the cutter normal into a normal plane to the space curve.

16. The system as recited in claim 15, wherein the normal plane to the edge is selected at the final intersection point of the cutter plane and the edge.

17. The system as recited in claim 15 wherein (h) further includes
   (i) computing a cross product of the cutter normal with any of the first and second tangent lines,
   (ii) computing a cross product of the result of (i) with any of the first and second tangent lines.

18. The system as recited in claim 13, further comprising, prior to (a):
   dividing the cutter profile into a plurality of segments, including straight line segments and circular segments;
   rotating each segment about the rotation axis of the cutter to generate a solid revolution for each segment; and
   in (c), computing a normal distance from each cutter segment to the first tangent line and selecting the shortest normal distance to generate the normal distance point on the cutter.

* * * * *